United States Patent

Egan

Patent Number: 5,969,747
Date of Patent: Oct. 19, 1999

[54] EFFICIENT LED LIGHT GEOMETRY FOR OPTICAL PRINTERS

[75] Inventor: Richard G. Egan, Dover, Mass.

[73] Assignee: Polaroid Corporation, Cambridge, Mass.

[21] Appl. No.: 08/574,673

[22] Filed: Dec. 19, 1995

[51] Int. Cl.⁶ ........................................ B41J 2/47
[52] U.S. Cl. ........................................ 347/256
[58] Field of Search ............................ 347/256

[56] References Cited

U.S. PATENT DOCUMENTS

| | | | |
|---|---|---|---|
| 4,714,983 | 12/1987 | Lang | 362/31 |
| 5,381,309 | 1/1995 | Borchardt | 362/31 |
| 5,420,761 | 5/1995 | DuNah et al. | 362/31 |

FOREIGN PATENT DOCUMENTS

| | | | |
|---|---|---|---|
| 07256928 | 10/1995 | Japan | B41J 2/445 |
| 08 256 928 | 10/1995 | Japan | B41J 2/445 |
| 2 281 802 | 3/1995 | United Kingdom | G02F 1/1335 |
| WO 94/18603 | 8/1994 | WIPO | G03C 1/00 |

*Primary Examiner*—Peter S. Wong
*Assistant Examiner*—K. Shin
*Attorney, Agent, or Firm*—Christopher P. Ricci; Robert J. Decker

[57] ABSTRACT

A light source is disclosed for use an optical printer illuminating a spatial light modulator to efficiently and uniformly project light onto a photosensitive medium while providing a simpler design of the spatial light modulator in the optical printer. The light source uses light emitting diodes opposed across a light pipe. The light from the light emitting diodes propagates in the light pipe until striking a redirection structure which redirects the light out of lateral surface of the light pipe.

19 Claims, 5 Drawing Sheets

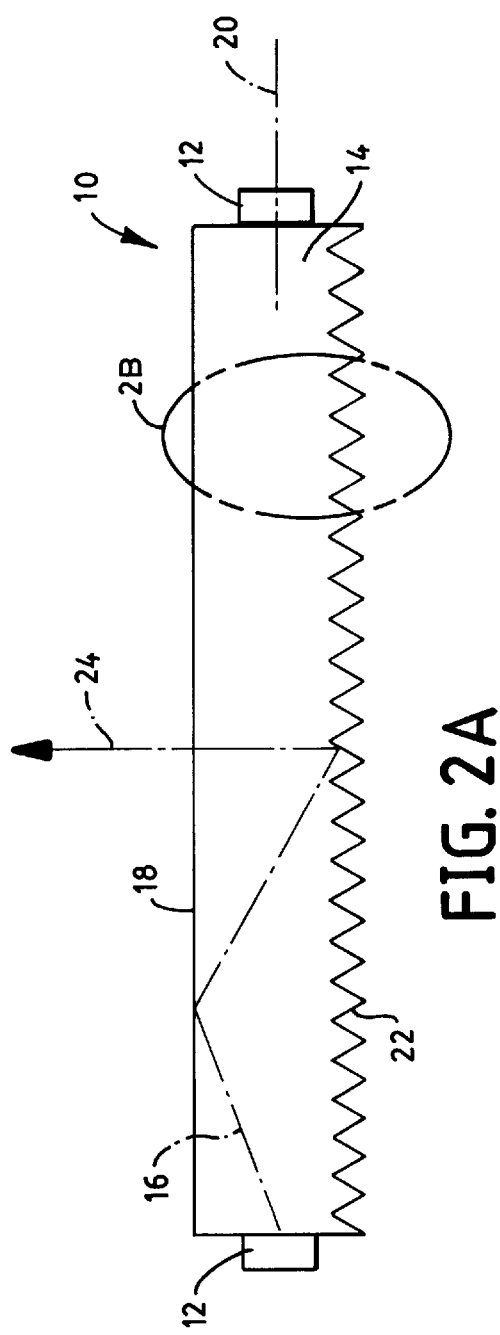
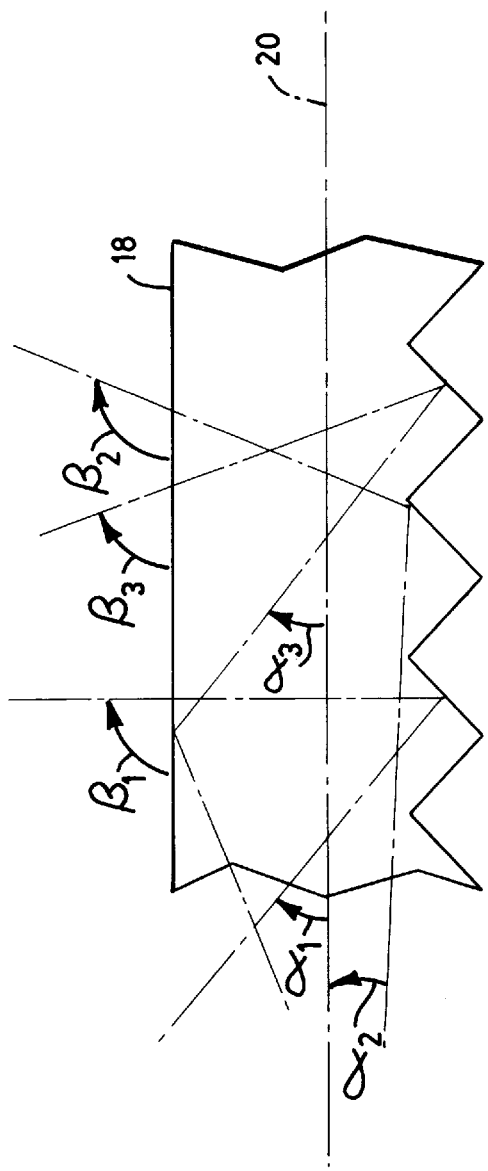
FIG. 2A
FIG. 2B

EFFICIENT LED LIGHT GEOMETRY FOR OPTICAL PRINTERS

BACKGROUND OF THE INVENTION

The present invention relates generally to electrophotographic printing and film recording apparatus, such as light emitting optical printers. More particularly, the invention relates to an efficient light emitting diode ("LED") light geometry for printing images optically by exposing a photosensitive recording medium to a light generated by light emitting diodes where the light is redirected substantially transverse to an axis of the light emitting diodes.

Optical printers make use of a variety of exposure devices such as lasers, spatial light modulators, and cathode ray tubes. All have been applied to expose photographic film as the photosensitive medium. FIG. 1 shows a prior art optical design with a light source 2 which can be any one of the aforementioned light generating devices. Light 3 is projected from the light source 2 in a conical shape where the edges of the cone have an angle θ relative to a central axis 9. The cone passes through a lens 4 where the central axis 9 is also the center of the lens 4 such that the cone is inverted through a spatial light modulator("SLM"), also known as a liquid crystal display, panel 5. The light 3 then passes through a projection lens 6 and is imaged onto a photosensitive medium 7. This optical system is well known in the art to have a problem in that the light has an intensity distribution over the photosensitive medium 7 according to a $\cos^4 \theta$ function. The distribution is shown in a graph 8 where the highest intensity of the light 3 is along the central axis 9 and quickly falls off towards the edges of the photosensitive medium 7. This non-uniform light distribution detrimentally affects the printed output since the image appears darker toward the edges of the photosensitive medium.

A further problem that is encountered with standard light sources 2 is with respect to the SLM panel 5. Conventional printhead designs use an SLM panel 5 that is row and column addressable and therefore each of the pixels in the SLM panel 5 are selectively turned on or turned off as is required for the particular image at any given time. A problem with this type of design is that the SLM panel 5 itself has to have electronics that can control a row and column addressing scheme for each individual pixel. As SLM panel designs get more complex, currently on the order of 1 million pixels per SLM panel, this addressing is taking up more and more valuable space on the SLM panel 5 and is becoming more and more complex. A further problem with such a design is that SLM panels are susceptible to leakage, where a pixel that is in an off state still allows some light to leak through, thereby decreasing a contrast ratio between neighboring pixels.

Another problem with conventional light sources is that, in practice, the actual radiation pattern is not the conical shape 3 that was previously described. The conical shape is a common approximation but the actual radiation pattern is an elliptical shape. Therefore, radiation projected outside the conical shape 3, which was described in the conventional optical system, is lost as unusable light, thereby decreasing the efficiency of the light source. Also, if the cone angle through the SLM is made large to increase light efficiency, then the contrast ratio of SLM will decrease.

The conventional optical system shown in FIG. 1 also illustrates another problem with currently available light sources. The light sources generally must be fixed behind a lens 4 at a distance that allows the light 3 to optimally project through the lens 4. Requiring such a distance makes the optical design more spaced out, which takes up valuable space within a printer.

Accordingly, it is an object of this invention to provide a light source for an optical printer that is compact to decrease required space within an optical printer.

It is another object of this invention to provide a light source that illuminates efficiently and uniformly so as to optimize printed output out of the optical printer.

It is still another object of the invention to simplify printhead design to allow use of less complex SLM panels in the optical printer.

It is a further object of the invention to increase contrast ratio between neighboring pixels to allow the optical printer to project sharper images onto the photosensitive medium.

These and other objects of the invention will be obvious and will appear hereinafter.

SUMMARY

The aforementioned and other objects are achieved by the invention which provides a light source for use in an optical printer. The light source is used with a printhead to project light onto a photosensitive recording medium in the optical printer to record an image thereon. The light source comprises a light projection means, a light pipe, and an optical redirection means.

The light projection means projects a beam of light substantially along a predefined central axis. The light projection means in the preferred embodiment are light emitting diodes, but can be any directed light source.

The light pipe is in optical communication with the light projection means. The light projection means can be used simply as one end of the light pipe or one can be disposed at each end of the light pipe. The latter method is used in the preferred embodiment to ensure uniformity of the light source. Light projection means then projects light into the light pipe where the central axis of the beam of light corresponds to the central axis of the light pipe. The beam of light is projected at an angle of internal reflection within the light pipe that is less than or equal to a critical angle of the light pipe, thus producing total internal reflection within the light pipe. Such total internal reflection allows the light to be promulgated along the light pipe with little or no loss of light out of the lateral surfaces of the light pipe.

Optical redirection means are secured to a lateral surface of the light pipe for redirecting the beam of light to a second angle that is greater than the first angle such that the beam of light emanates from the light pipe. In other words, the optical redirection means which is attached to the side of the light pipe receives the beam of light and redirects it substantially transverse through the central axis such that the light emanates from a lateral surface of the light pipe. The optical redirection means in the preferred embodiment is either a holographic film or a substantially linear array of microprisms.

In further aspects, the invention provides methods in accord with the apparatus described above. The aforementioned and other aspects of the invention are evident in the drawings and in the description that follows

BRIEF DESCRIPTION OF THE DRAWINGS

The foregoing and other objects of this invention, the various features thereof, as well as the invention itself, may be more fully understood from the following description, when read together with the accompanying drawings in which:

FIG. 2A shows a light source in accordance with the present invention utilizing a substantially linear array of microprisms;

FIG. 2B is a magnified view of a section of FIG. 2A illustrating reflections of incident light on the microprisms;

DETAILED DESCRIPTION

Figure 1:
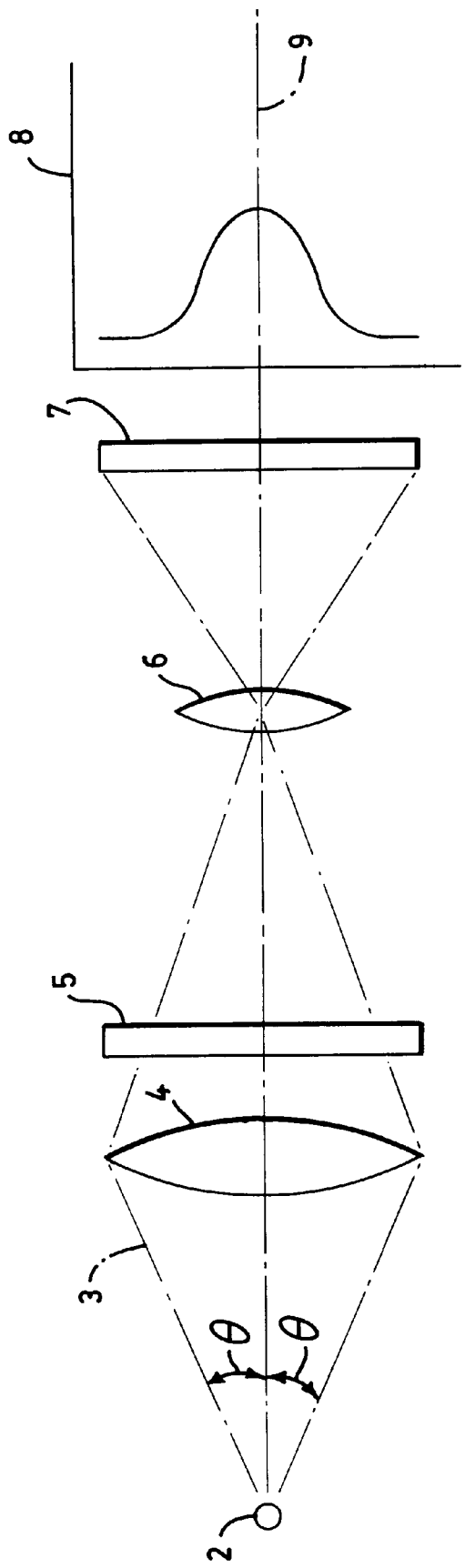
FIG. 1 shows a prior art optical system.

While the present invention retains utility within a wide variety of printing devices and may be embodied in several different forms, it is advantageously employed in connection with an optical printer for printing on photosensitive print media. Though this is the form of the preferred embodiment and will be described as such, this embodiment should be considered illustrative and not restrictive.

FIG. 2A shows a light source according to the present invention which can be used in an optical printer for recording electronic images onto a photosensitive recording medium. In this embodiment, the light source 10 is shown using microprisms 22 to redirect the light. The light is generated by light emitting diodes ("LED"'s) 12 where an LED is located on either end of the light source 10. The LED's 12 project a beam of light 16 into a light pipe 14. The light pipe 14 is designed such that the beam of light 16 is totally internally reflected thereby inhibiting loss of light and conducting the light along the length of the light pipe 14.

The angle of incidence for which the refracted ray emerges tangent to the surface is called the critical angle. If the angle of incidence is greater than the critical angle, the sine of the angle of refraction as computed by Snell's Law would have to be greater than unity. This may be interpreted to mean that beyond the critical angle, the ray does not pass into the upper medium, but is totally internally reflected at the boundary surface. Total internal reflection can occur only when a ray is incident on a surface of a medium whose index is smaller than that of the medium in which the ray is traveling.

The critical angle for two given substances may be found by setting the angle of refraction to 90°, which makes the sine of that angle equal to 1 in Snell's Law.

$$\sin\phi_{crit} = \frac{n_b}{n_a}$$

where $n_a$ is the refractive index for a medium a $n_b$ is the refractive index for a second medium b $n_a > n_b$ The critical angle for a glass air surface, which will be the common interface in the preferred embodiment, is, taking 1.50 as a typical index of refraction for glass, $$\sin\phi_{crit} = \frac{1}{1.50} = 0.67, \phi_{crit} = 42°.$$

The fact that the angle is slightly less than 45° makes it possible to use a prism having angles 45°, –45°, or –90° as a totally reflecting surface. The advantages of totally reflecting prisms over metallic surfaces as reflectors are first, that the light is totally reflected, while no metallic surface reflects 100% of the light incident upon it, and second, the reflective properties are permanent, and not affected by tarnishing. Offsetting these is the fact that there is some loss of light by reflection at the surfaces where light enters and leaves the prism, although coating the surfaces with so-called "nonreflecting" films can reduce this loss considerably.

If a beam of light enters one end of the light pipe 14, the light is totally reflected internally and is "trapped" within the light pipe 14, even if the light pipe is curved, provided the curvature is not too great.

FIG. 2A shows a single light beam 16 from the LED 12 for simplicity of this illustration. The light beam 16 reflects off a lateral surface 18 of the light pipe 14, and is totally internally reflected, as was previously described. The light beam 16 is then reflected downward to a portion of the light pipe 14 that is embedded with microprisms 22. Light beam 16 is then incident upon a surface of a microprism, and is reflected at a new angle greater than the critical angle, toward the lateral surface of the light pipe 18 such that the reflected light beam 24 emanates therefrom.

FIG. 2B is a magnified view of a section of the light pipe 14 of FIG. 2A, where three light beams are shown. Also shown is a central axis 20 of the light pipe 14 such that the angles with respect to the central axis 20 can be illustrated. In this example, a first light beam comes in as was described previously, and strikes the microprisms 22 substantially in a center portion of the surface of the microprism 22. This occurs when the angle of the light beam $\alpha_1$ is approximately 45° with respect to the central axis, thereby reflecting off of the microprism 22 at an angle $\beta_1$, which is substantially normal to the central axis 20.

Light beam #2 is reflected off of the lateral surface 18 of the light pipe 14 forming an angle with the central axis $\alpha_2$, which is substantially less than $\alpha_1$, causing light beam #2 to be reflected off a top portion of the microprism 22, therefore emanating from the light pipe 14 at an angle $\beta_2$ which is greater than $\beta_1$. In contrast, light beam #3 has an angle $\alpha_3$, which is greater than $\alpha_1$, and therefore reflects off a lower surface of the microprism 22, causing the light beam #3 to emanate from the light pipe 14 at an angle $\beta_3$, which is less than $\beta_2$.

Figure 3C:
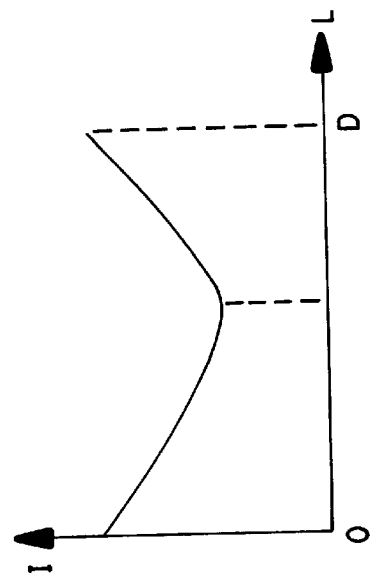
FIG. 3C is a graph of light intensity versus distance for the light source according to FIG. 3A.
Figure 3A:
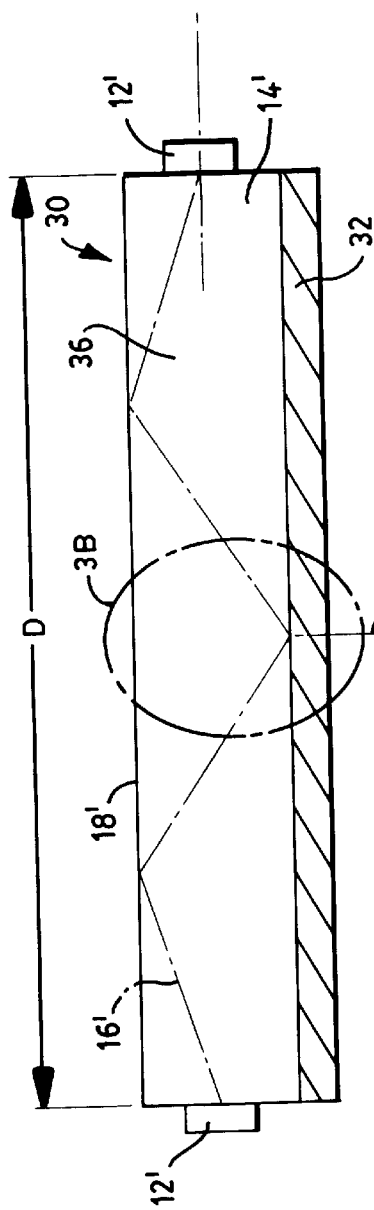
FIG. 3A shows a cross-sectional view of a light source in accordance with the present invention utilizing a holographic film.

FIG. 3A shows an alternative embodiment of the light source, where like numerals designate previously described elements. In this embodiment, the microprisms are replaced by a holographic film 32 in the light source 30. The holographic film 32 is laminated onto a lateral surface 18' of the light pipe 14' along an entire length, "D", of the light pipe 14'.

An advantage of using a holographic film with LED's 12' is that holographic films are by their nature efficient over a narrow band of light, i.e., over a relatively small range of wavelengths of light. In fact, in computer display systems utilizing holographic film with white light, the efficiency of the holographic film must be specifically decreased in order to get such a broad band. Therefore, since LED's 12' generally illuminate over a narrow band width, a holographic film can be designed to have those characteristics to efficiently redirect light over those band widths only thereby tuning the holographic film to correspond to the output of the LED's 12'.

Figure 3B:
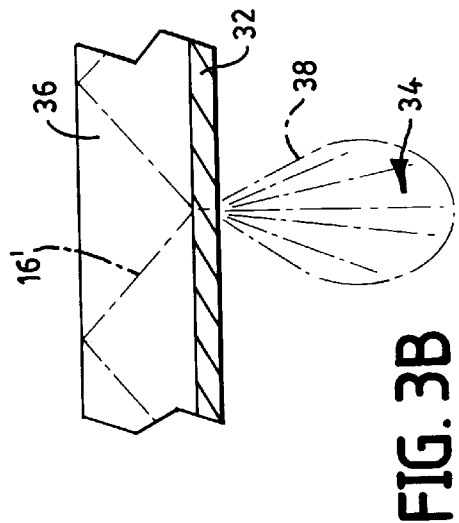
FIG. 3B shows a magnified view of a section of the light source of FIG. 3A illustrating light as it emanates from the holographic film.

In FIG. 3A, and as is further shown in FIG. 3B, a second light beam 36 is shown along with the first light beam 16' which is being projected from the second LED 12'. It should be noted that in the previous figure, light beams are likewise being projected from either end, as is shown here, but for the sake of simplicity was not illustrated in the previous depiction. Hence, the two light beams 16' and 36 come into optical contact with the holographic film 32. The holographic film 32 redirects the light such that light is transmitted therethrough. In this embodiment, a transmission-type hologram is used, though a reflective hologram could also be used which would be analogous to the microprism structures previously shown. Light 34 emanating from the holographic film 32 is projected in elliptical shape 38 similar to that of a standard light source. The light emanating from the light pipe 14' through the lateral surface 18' acts as a defraction grading. The holographic film 32 is analogous to a slit in the defraction grading which gives rise to a defracted beam, where the defracted beams interfere with each other to produce a final pattern. With a defraction grading, each beam spreads out over a sufficiently wide angle for it to interfere with all of the other defracted beams. As the angle θ increases or decreases with respect to β, the disturbances from the defraction elements no longer arrive in phase with one another, and even an extremely small change in the angle β results in almost complete destructive interference among them. Hence, the maximum at the angle β is an extremely sharp one, differing from a rather broad maxima and minima that result from interference or defraction effects with a small number of openings. Therefore, light emanating from the light pipe 14' is substantially collimated in a direction normal to the central axis 20.

FIG. 3C shows a graph of intensity over a length of the light pipe 14'. While this graph is specifically shown with this embodiment, it is also a graph of intensity versus length for the previous embodiment. It can be seen from this graph that intensity, 'I', increases at the ends of the light pipe 14' where a proximal end of the light pipe 14' is designated as zero on the graph and a distal end is marked 'D' since 'D' is the length of the light pipe 14'. It can be seen from the graph that the light has its lowest intensity in a center portion of the light pipe 14'. Using this light source having this light distribution with the standard optical system shown in FIG. 1, it can be seen that the graph of the light intensity shown in FIG. 3C substantially complements the graph 8 of the standard optical system which has a highest intensity in a center portion and a lowest intensity along the ends, thereby creating a substantially uniform light source across a print medium 7.

Figure 4:
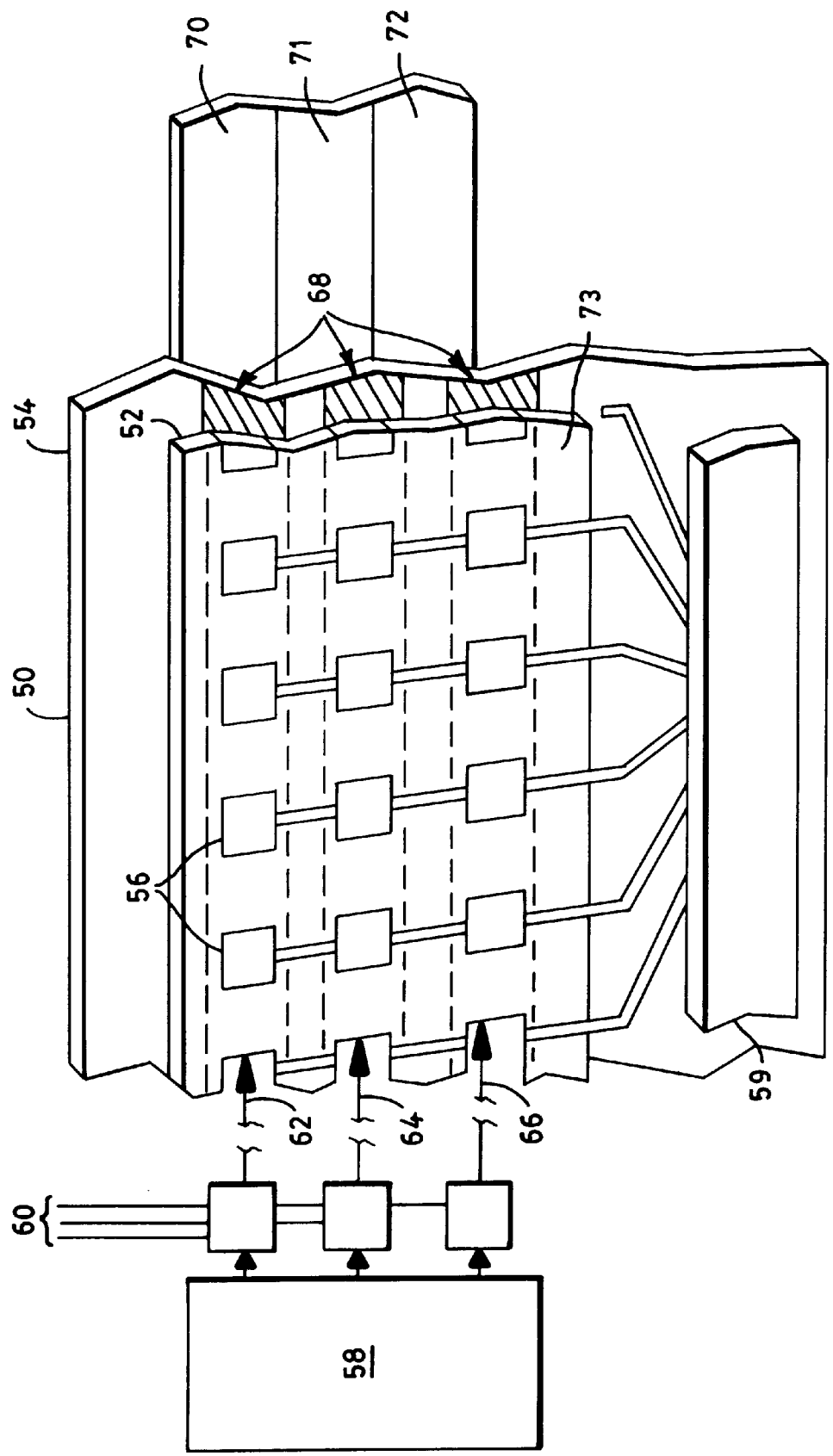
FIG. 4 shows a perspective view of a cutaway of a print head using the light source in accordance with the invention.

FIG. 4 illustrates a print head design 50 using the light source of the invention. In this embodiment, a glass substrate 54 and polarizer is laminated with three or more Indium Tin Oxide ("ITO") rows 68. The ITO rows 68 are the back transparent electrodes for the SLM 73. A single common ITO could also be used. The light from red light source 70 is colorized by using red LED's to project red light. A green light source 71 projects green light and a blue light source 72 likewise projects blue light. One skilled in the art will realize that other primary colors can be used without detriment to the invention.

The light from the light sources 70, 71, 72 is projected onto an SLM panel 52 which is driven externally to designate which pixels are on and off. Such external driving can be performed by a microprocessor (not shown), for example, internal to the optical printer. A row is selected by turning on a single light source 70, 71, 72, such that only one row of colors is illuminated at any given time. Time delay sequencing of the row data is then used to overlap red, green, and blue onto a single row on the moving film to create a color image.

The column driver 59 determines which pixels 56 in the individual row should be on or off. Since only one light source is on, contrast ratio is increased by not allowing the off rows to leak light through the SLM 73. The column driver need only turn on or off the individual light pixels.

Figure 5:
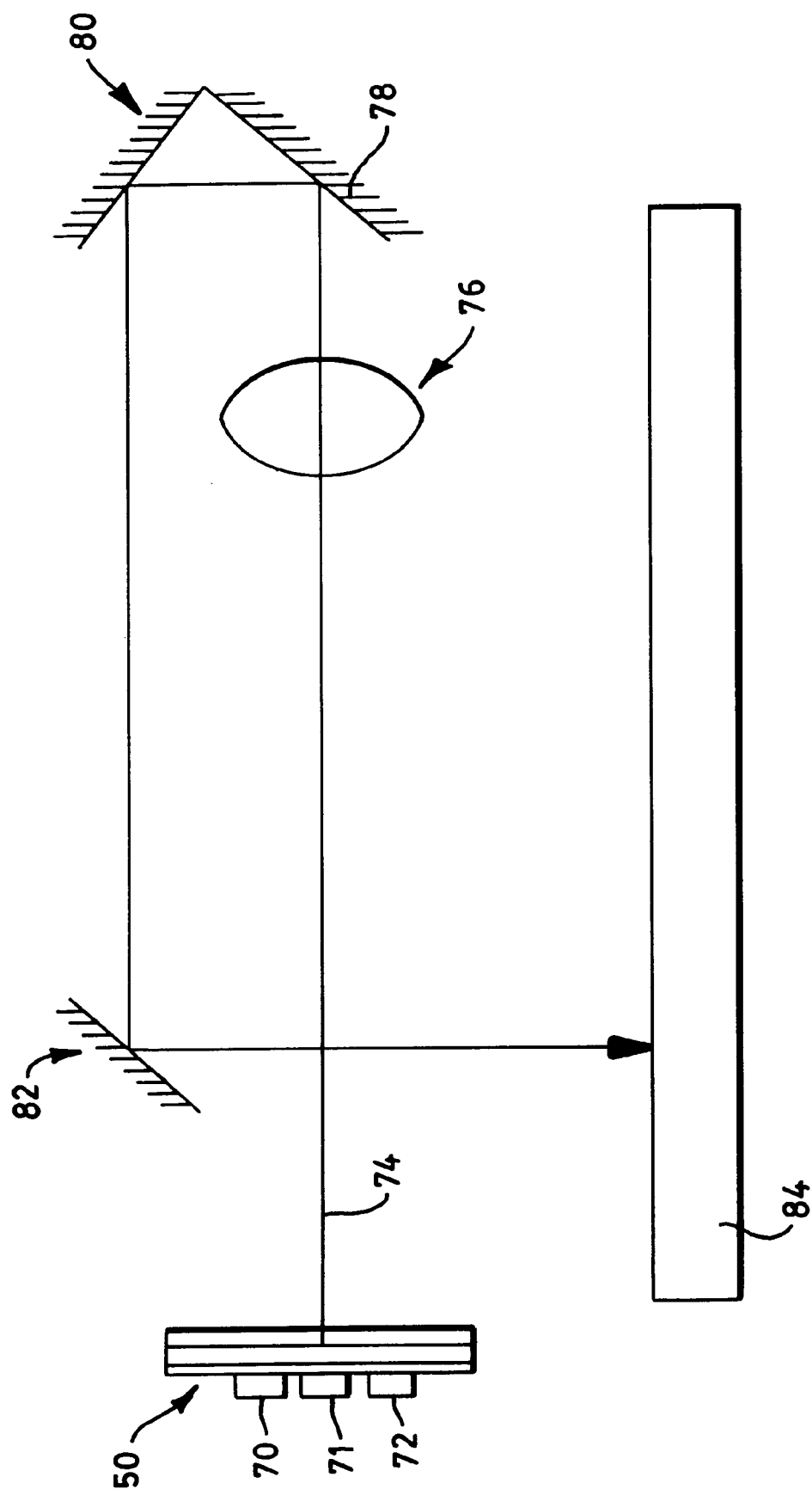
FIG. 5 shows a schematic view of an optical design of an optical printer using a print head in accordance with FIG. 4.

FIG. 5 shows a sample optical design for using the printhead 50 within an optical printer. The light sources 70, 71, 72 each sequentially project a line of color image-bearing light 74 which was described in FIG. 4. The light is projected through a projection lens 76 and reflected off of a first mirror 78, a second mirror 80, and off a third mirror 82 down to a photosensitive medium 84. These reflections allow the optical designer to increase focal lengths without losing the compactness of design in the optical printer by allowing the optical printer to image a photosensitive medium 84 with long focal distances but with a short proximity to the actual photosensitive medium 84.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A plurality of color light sources suitable for use in printing on a photosensitive medium, each of said plurality of color light sources comprising:

light projection means for projecting at least one beam of light;

a light pipe comprising a first surface and a second surface, said light pipe in optical communication with said light projection means such that said beam of light enters said light pipe and is incident upon said first surface at an angle less than or equal to the critical angle so as to produce a totally internally reflected beam of light within said light pipe; and optical redirection means disposed at said second surface such that when said reflected beam of light is incident upon said second surface, said reflected beam of light is emitted from said light pipe; and said plurality of color light sources in adjacent alignment for projecting colored light that is substantially collimated.

2. A light source according to claim 1 wherein the light projection means has two light emitting elements opposed at each terminus of the light pipe.

3. A light source according to claim 1 wherein the light projection means comprises at least one light emitting diode.

4. A light source according to claim 1 wherein the light pipe has an index of refraction less than that of air.

5. A light source according to claim 4 wherein the light pipe is a glass fiber.

6. A light source according to claim 1 wherein the optical redirection means comprises a plurality of mirrors oriented so as to redirect the beam of light substantially normal to the central axis of the light pipe.

7. A light source according to claim 1 wherein the optical redirection means comprises a plurality of microprisms oriented so as to redirect the beam of light substantially normal to the central axis of the light pipe.

8. A light source according to claim 1 wherein the optical redirection means comprises a hologram fabricated so as to redirect the beam of light substantially normal to the central axis of the light pipe.

9. A light source according to claim 8 wherein the hologram is transmissive such that the when the beam of light becomes incident on the hologram the beam is redirected through the hologram out of a lateral surface of the light pipe.

10. A light source according to claim 8 wherein the hologram is reflective such that the when the beam of light becomes incident on the hologram the beam is reflected off of the hologram out of a lateral surface of the light pipe substantially opposed to the hologram.

11. A light source according to claim 1 wherein the optical redirection means is adapted to redirect the beam of light such that destructive interference occurs thus forming substantially collimated light.

12. A light source according to claim 1 wherein the optical redirection means efficiently redirects a narrow range of wavelengths of the light.

13. A light source according to claim 12 wherein the narrow range of wavelengths of light is tuned to correspond to the output of the light projection means.

14. A print head for use in an optical printer which prints on a photosensitive medium having a relative motion with respect to the print head, the print head comprising:

a plurality of color light sources in adjacent alignment for projecting colored light that is substantially collimated, each said light source comprising:
light projection means; and
a light pipe comprising a first surface and a second surface, said light pipe in optical communication with said light projection means such that said beam of light enters said light pipe and is incident upon said first surface at an angle less than or equal to the critical angle so as to produce a totally internally reflected beam of light within said light pipe; and
optical redirection means disposed at said second surface such that when said reflected beam of light is incident upon said second surface, said reflected beam of light is emitted from said light pipe; and a spatial light modulator in optical alignment with said plurality of color light sources, said spatial light modulator comprising a plurality of columns corresponding to a column of pixel locations on the photosensitive medium where each of said plurality of columns is driven independently, said plurality of columns being driven such that an intersection of each of said plurality of color light sources and said plurality of columns defines a line of pixels on the photosensitive medium.

15. A print head according to claim 14 wherein row selection in the print head is performed by illuminating one of the plurality of color light sources.

16. A print head according to claim 14 wherein the line of pixels is sequentially overlaid with each color using time delay integration.

17. A light source for use in an optical printer that projects light through a conventional lens system having a first light distribution to generate an image on a photosensitive medium, said light source comprising:

illumination means for projecting light along an optical path; and light distribution means disposed in the optical path of the illumination means for distributing the light according to a second light distribution where the second light distribution is substantially complimentary to the first light distribution, thus forming a substantially uniform light distribution across the photosensitive medium, said light distribution means comprising a light pipe comprising a first surface and a second surface, such that a beam of light entering said light pipe and incident upon said first surface at an angle less than or equal to the critical angle produces a totally internally reflected beam of light within said light pipe; and when said reflected beam of light is incident upon said second surface, said reflected beam of light is emitted from said light pipe.

18. A light source according to claim 17 wherein the second light distribution has highest intensity in a center portion and a lowest intensity at each terminus.

19. A light source according to claim 17 wherein the light distribution means further comprises a light pipe in optical communication with the illumination means such that a first angle of internal reflection of the light within the light pipe is less than or equal to a critical angle thus producing total internal reflection within the light pipe; and optical redirection means secured to a lateral surface of the light pipe for redirecting the beam of light to a second angle greater than the first angle such that the beam of light emanates from the light pipe.

* * * * *